United States Patent
Fujii

(10) Patent No.: US 10,795,542 B2
(45) Date of Patent: Oct. 6, 2020

(54) INFORMATION PROCESSING APPARATUS AND NON-TRANSITORY COMPUTER READABLE MEDIUM FOR STREAMLINING OPERATION SCREENS

(71) Applicant: FUJI XEROX CO., LTD., Tokyo (JP)

(72) Inventor: Hideo Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 273 days.

(21) Appl. No.: 15/255,855

(22) Filed: Sep. 2, 2016

(65) Prior Publication Data

US 2017/0277370 A1   Sep. 28, 2017

(30) Foreign Application Priority Data

Mar. 25, 2016   (JP) ................... 2016-061163

(51) Int. Cl.
*G06F 3/0482* (2013.01)
*H04N 1/00* (2006.01)

(52) U.S. Cl.
CPC ....... *G06F 3/0482* (2013.01); *H04N 1/00411* (2013.01); *H04N 1/00424* (2013.01); *H04N 2201/0094* (2013.01); *H04N 2201/3204* (2013.01)

(58) Field of Classification Search
None
See application file for complete search history.

(56) References Cited

U.S. PATENT DOCUMENTS

| | | | | |
|---|---|---|---|---|
| 5,682,490 A | * | 10/1997 | Sumino | G06F 9/451 715/840 |
| 2004/0001098 A1 | * | 1/2004 | Numano | G06F 3/0489 715/773 |
| 2008/0115131 A1 | * | 5/2008 | Kelsey | G06F 8/60 718/100 |
| 2013/0113823 A1 | | 5/2013 | Umezawa et al. | |
| 2016/0011730 A1 | * | 1/2016 | Rajasekar | G06F 9/451 715/735 |
| 2016/0191163 A1 | * | 6/2016 | Preston | G01B 11/161 398/16 |
| 2017/0272606 A1 | * | 9/2017 | Wang | H04N 1/32609 |

FOREIGN PATENT DOCUMENTS

| | | |
|---|---|---|
| JP | 2008-022456 A | 1/2008 |
| JP | 2013-102350 A | 5/2013 |
| JP | 2014-056592 A | 3/2014 |

OTHER PUBLICATIONS

Bing search q=display%20previously%20executed%2 (Year: 2020).*
Bing search q=display+stopped+printer+scanner+p (Year: 2020).*
Nov. 26, 2019 Office Action issued in Japanese Patent Application No. 2016-061163.

* cited by examiner

*Primary Examiner* — Cesar B Paula
*Assistant Examiner* — John M Heffington
(74) *Attorney, Agent, or Firm* — Oliff PLC

(57) ABSTRACT

An information processing apparatus that serves as a display that displays a list of processes executed by applications includes a list display controller and an operation screen display controller. The list display controller causes, for each of the processes, an operator to be displayed in the list, the operator being provided for displaying an operation screen for performing operation of a function that is specific to corresponding one of the applications. The operation screen display controller causes the operation screen provided for the operator to be displayed when the operator is operated in the list.

9 Claims, 11 Drawing Sheets

FIG. 5

| DEVICE INFORMATION MANAGEMENT APPLICATION (devicemrg.exe) ||
|---|---|
| CALLING PARAMETER | DESCRIPTION |
| NIL | OPEN DEVICE LIST SCREEN |
| -s [printer/scanner/fax] | OPEN DETAIL SCREEN FOR DESIGNATED DEVICE |

| FILE LIST APPLICATION (filebrowser.exe) ||
|---|---|
| CALLING PARAMETER | DESCRIPTION |
| -p [folder] | DESIGNATE FOLDER TO BE OPENED |
| -s [file1, file2, ...] | DESIGNATE FILE(S) TO BE DISPLAYED IN SELECTED STATE |
| -b | DESIGNATE FUNCTION BUTTON TO BE DISPLAYED IN SELECTED STATE |
| [print/delete/open/copy] | print: PRINT BUTTON, delete: DELETE BUTTON, open: OPEN BUTTON, copy: COPY BUTTON |

FIG. 6

| ATTRIBUTE | DESCRIPTION |
|---|---|
| ID | IDENTIFIER OF JOB (ASSIGNED BY JOB MANAGEMENT APPLICATION) |
| START DATE/TIME | JOB START TIME (PROVIDED BY JOB MANAGEMENT APPLICATION) |
| STATUS | JOB STATUS (IN EXECUTION/PAUSED/COMPLETE) (UPDATED BY APPLICATION TO PROCESS JOB) |
| CONTENT | JOB PROCESS CONTENT (WRITTEN BY APPLICATION TO PROCESS JOB) |
| COMMENT | SUPPLEMENTARY INFORMATION REGARDING JOB (WRITTEN BY APPLICATION TO PROCESS JOB) |
| CALLING INFORMATION | LIST OF COMMAND FOR CALLING APPLICATION FUNCTION, PARAMETER TEXT STRING, AND PAIRED TEXT STRINGS FOR DISPLAYING BUTTON (WRITTEN BY APPLICATION TO PROCESS JOB) |

FIG. 7

| ATTRIBUTE | DESCRIPTION |
|---|---|
| ID | 101 |
| START DATE/TIME | 12/10/2015 21:19:50 |
| STATUS | COMPLETE |
| CONTENT | DETECT DRAWING DIFFERENCE: ELECTRONICALLY INPUT No. 8 |
| COMMENT | THE JOB IS SUCCESSFULLY COMPLETE.<br>FOR CHECK THE RESULT, CLICK THE "CHECK" BUTTON. |
| CALLING INFORMATION | ({Filebrowser.exe -p "c\:User\fujii\" -s<br>"input_org.xdw, input_change.xdw, result.xdw" -b "open"}, {Check}) |
| ID | 102 |
| START DATE/TIME | 12/10/2015 22:10:31 |
| STATUS | COMPLETE |
| CONTENT | SCAN AND TRANSLATE: LOW TRANSLATION ACCURACY |
| COMMENT | TRANSLATION ACCURACY MIGHT BE LOW. CLICK THE "CHECK RESULT" BUTTON TO CHECK A DOCUMENT TO BE SCANNED AND/OR TRANSLATED. FOR RETRY, CLICK THE "CHECK SCANNER" BUTTON TO CHECK THE SCANNER STATE. |
| CALLING INFORMATION | ({Filebrowser.exe -p "c\:User\fujii\" -s "org_scanned.tiff, honyaku_result.xdw"<br>-b "open"}, {Check result}) ({devicemgr.exe -s "scanner"}, {Check scanner}) |

FIG. 12A

| File name | |
|---|---|
| honyaku_result.xdw | Open |
| input_org.xdw | Delete |
| input_changed.xdw | Print |
| org_scanned.tiff | Copy |
| result.xdw | |

FIG. 12B

| File name | |
|---|---|
| input_org.xdw | Open |
| input_changed.xdw | Delete |
| result.xdw | Print |
| | Copy |
| | |

FIG. 12C

| File name | |
|---|---|
| honyaku_result.xdw | Open |
| org_scanned.tiff | Delete |
| | Print |
| | Copy |
| | |

FIG. 13A

| Device name | Status | Detail checking |
|---|---|---|
| Printer | Normally operating | [Open] |
| Scanner | Ready (alert present) | [Open] |
| Fax | Stopped | [Open] |

FIG. 13B

| Scanner detail Parts name | Status | Detail |
|---|---|---|
| DADF | Normal | |
| Platen | Normal | |
| Reader | Cleaning needed | [Contact for maintenance] |
| Exposer | Normal | |

INFORMATION PROCESSING APPARATUS AND NON-TRANSITORY COMPUTER READABLE MEDIUM FOR STREAMLINING OPERATION SCREENS

CROSS-REFERENCE TO RELATED APPLICATIONS

This application is based on and claims priority under 35 USC 119 from Japanese Patent Application No. 2016-061163 filed Mar. 25, 2016.

BACKGROUND

(i) Technical Field

The present invention relates to an information processing apparatus, a non-transitory computer readable medium, and an information processing method.

(ii) Related Art

Some of information processing apparatuses having multiple applications display a list of processes of the applications. The process list covers items shared by the applications such as the start and end times of each process of the corresponding application, the name of a user who designates the process, the progress of the process, and success or failure of the process.

SUMMARY

According to an aspect of the invention, there is provided an information processing apparatus that serves as a display that displays a list of processes executed by applications. The information processing apparatus includes a list display controller and an operation screen display controller. The list display controller causes, for each of the processes, an operator to be displayed in the list, the operator being provided for displaying an operation screen for performing operation of a function that is specific to corresponding one of the applications. The operation screen display controller causes the operation screen provided for the operator to be displayed when the operator is operated in the list.

BRIEF DESCRIPTION OF THE DRAWINGS

An exemplary embodiment of the present invention will be described in detail based on the following figures, wherein:

FIG. 5 is a table illustrating example pieces of calling information;

FIG. 6 is a table illustrating the data structure of job management information;

FIG. 7 is a table illustrating example pieces of job management information;

FIGS. 12A, 12B, and 12C are diagrams illustrating the screen transition according to the exemplary embodiment; and FIGS. 13A and 13B are diagrams illustrating the screen transition according to the exemplary embodiment.

DETAILED DESCRIPTION

Configuration

An example of an exemplary embodiment of the present invention will be described.

Figure 1:
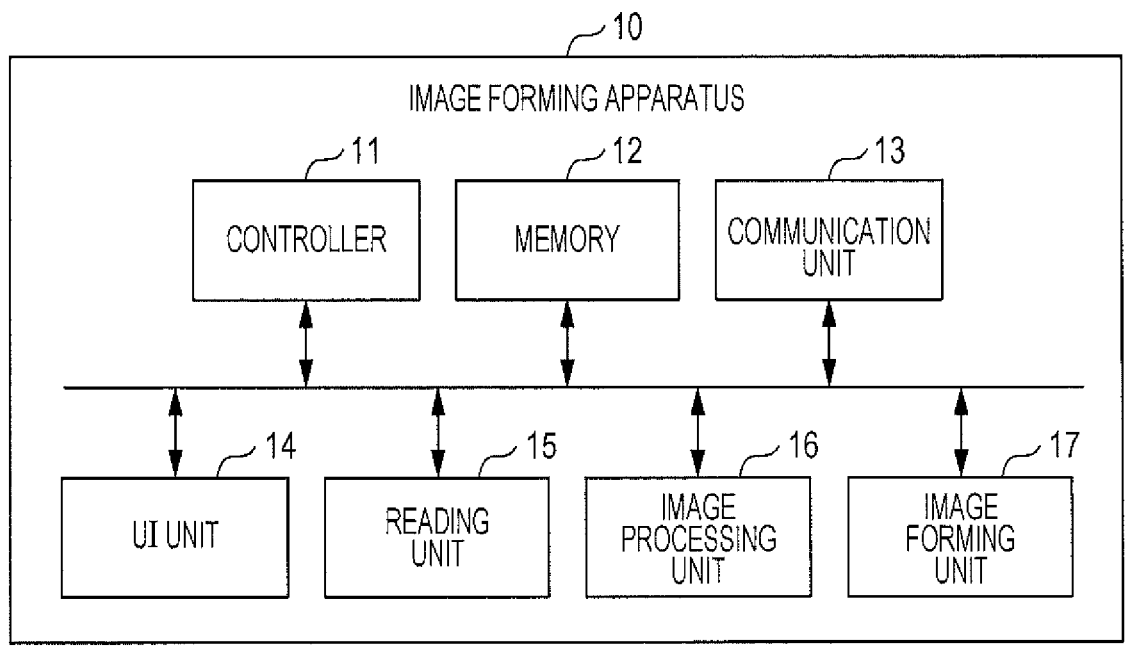
FIG. 1 is a diagram illustrating the hardware configuration of an image forming apparatus.

FIG. 1 is a diagram illustrating the hardware configuration of an image forming apparatus 10. The image forming apparatus 10 is an example of an information processing apparatus according to the exemplary embodiment. The image forming apparatus 10 includes a controller 11, a memory 12, a communication unit 13, a user interface (UI) unit 14, a reading unit 15, an image processing unit 16, and an image forming unit 17.

The controller 11 includes a computing device such as a central processing unit (CPU) and memory devices such as a read only memory (ROM) and a random access memory (RAM) and performs overall control of the image forming apparatus 10 including display control as to be described later. The ROM stores firmware describing procedures for starting hardware or the operating system (OS). The RAM is used to store data used for the CPU to execute computation. The memory 12 includes, for example, a semiconductor memory and a hard disk memory device and stores not only the OS but also applications (programs) for implementing various functions and pieces of data. The communication unit 13 includes a communication interface (I/F) for communications with an external electronic device. The communication unit 13 is connected to a communication network such as a local area network (LAN).

The UI unit 14 includes a display and an operation unit. The display includes, for example, a liquid crystal display device and displays, on a display surface, a UI screen used for a user operation of the image forming apparatus 10. The operation unit includes, for example, a touch panel covering the display surface of the display or a keyboard adjacent to the display surface. The operation unit receives a user operation and outputs a signal corresponding to the operation to the controller 11. The controller 11 controls the image forming apparatus 10 in accordance with the operation.

The reading unit 15 optically reads a document and generates image data. The reading unit 15 is, for example, an image scanner including platen glass, a light source, an optical system, a color filter, and an imaging device. The light source radiates light onto the document placed on the platen glass, and light reflected on the document enters the imaging device through the optical system and the color filter. The imaging device converts the incident light into an image signal and outputs the image signal to the image processing unit 16. The image processing unit 16 performs image processing such as screen processing and color conversion on the image signal output from the reading unit 15 and generates raster data. The image forming unit 17 forms an image based on the raster data generated by the image processing unit 16 on paper that is a recording medium.

Examples of an image forming method includes an electrophotographic system and an inkjet system.

Figure 2:
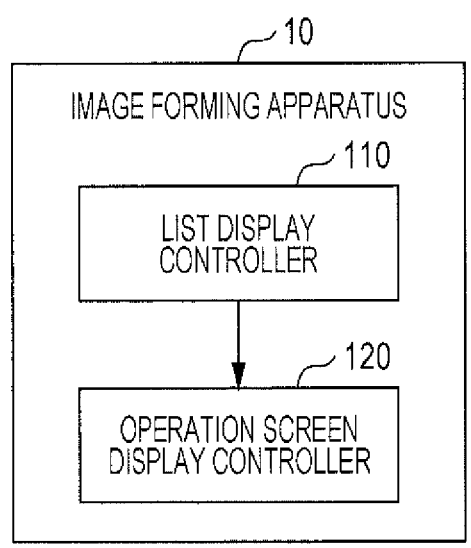
FIG. 2 is a block diagram illustrating the functional configuration of the image forming apparatus.

FIG. 2 is a block diagram illustrating the functional configuration of the image forming apparatus 10. These functions are implemented in such a manner that the controller 11 runs the programs stored in the ROM and the memory 12. A list display controller 110 displays a list of processes executed by the applications on the display. Further, the list display controller 110 displays, in the list, operators each for displaying a corresponding operation screen for performing operation of an application-specific function in a process. When the user performs operation on any one of the operators in the list, an operation screen display controller 120 displays an operation screen provided for the operator on the display. The operation screen enables the user to operate the function of the application.

Figure 3:
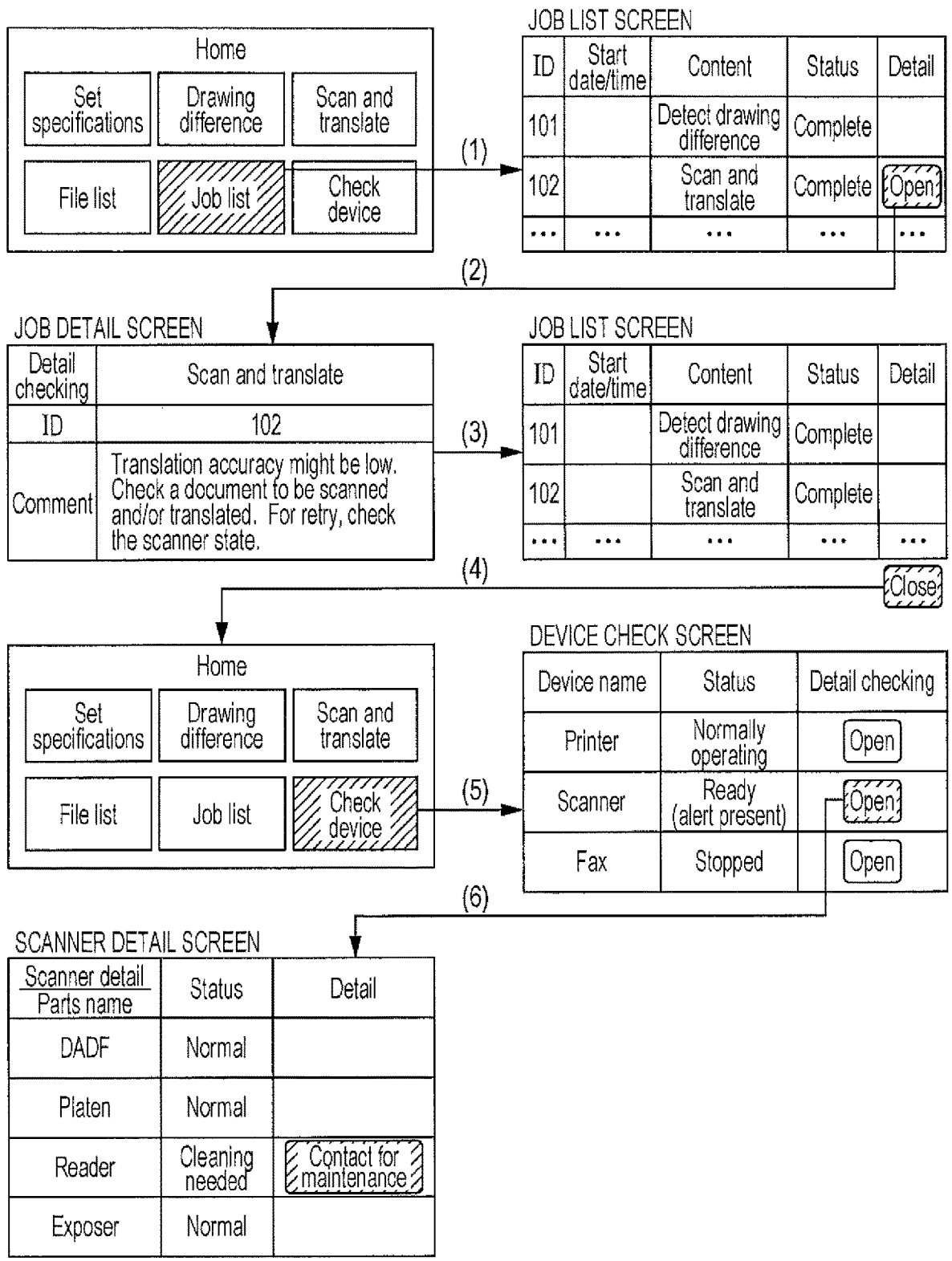
FIG. 3 is a diagram illustrating screen transition according to a comparative example.

Transition among screens displayed by the image forming apparatus 10 according to the exemplary embodiment and screen transition in a comparative example will be described for easier understanding of the exemplary embodiment. The screen transition is implemented in such a manner that the controller 11 performs display control of the display. In the comparative example illustrated in FIG. 3, when the user performs operation on an operator image "Job list" on the initial screen called a Home screen, the Home screen transitions to a job list screen (arrow (1)). In the exemplary embodiment, the term "job" corresponds to a "process" performed in the exemplary embodiment. When the user selects an operator image "Open" for a job "Scan and translate" out of jobs included on the job list screen, the screen transitions to a job detail screen (arrow (2)). The job detail screen displays a detailed message regarding the selected job and reveals that, in the example in FIG. 3, the state of a scanner (the reading unit 15) needs to be checked. The user accordingly performs operation on an operator image "Close" on the job detail screen not to display the job detail screen at the present time. The screen returns to the job list screen (arrow (3)). Further, the user performs operation on the operator image "Close" on the job list screen not to display the job list screen, and the screen returns to the Home screen (arrow (4)). When the user performs operation on the operator image "Check device" for checking the state of the scanner (reading unit 15) on the Home screen, the screen transitions to a device check screen (arrow (5)). When an operator image "Open" for "Scanner" is selected on the device check screen, the screen transitions to a scanner detail screen (arrow (6)). The user checks the state of the scanner on the scanner detail screen.

Figure 4:
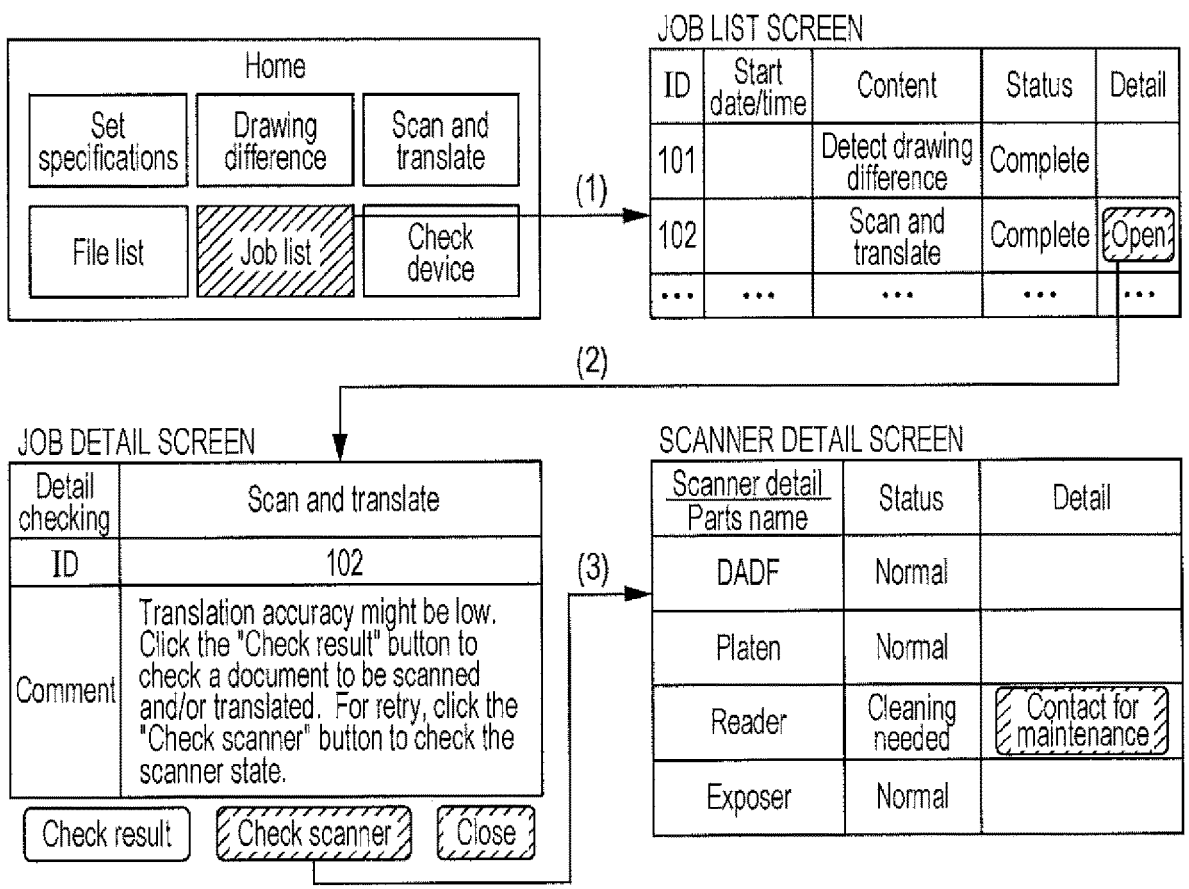
FIG. 4 is a diagram illustrating screen transition according to the exemplary embodiment.

In contrast, in the screen transition according to the exemplary embodiment illustrated in FIG. 4, when the user performs operation on an operator image "Job list" on a Home screen, the Home screen transitions to a job list screen (an example of a list of processes in the exemplary embodiment) (arrow (1)). When the user selects an operator image "Open" for a job "Scan and translate" out of jobs included on the job list screen, the screen transitions to a job detail screen (an example of an operation screen according to the exemplary embodiment) (arrow (2)). The job detail screen displays a detailed message regarding the selected job and reveals that, in the example in FIG. 4, the state of the scanner (reading unit 15) needs to be checked. The job detail screen further includes an operator image "Check scanner" for checking the state of the scanner. When the user performs operation on the operator image, the screen transitions to a scanner detail screen (arrow (3)). The scanner detail screen is displayed by a function specific to an application that performs the scan and translation. The user checks the state of the scanner on the scanner detail screen. As described above, six steps are needed to reach the scanner state checking (application-specific function) in the scan and translation application in the comparative example, while three steps are needed in the exemplary embodiment.

Referring back to FIG. 1, the memory 12 stores pieces of calling information as illustrated in FIG. 5. Each piece of calling information is a set composed of an application to be called from the process list and a parameter used to call the application (information designating an application-specific function). For example, in the example in FIG. 5, a set composed of a piece of information designating a device information management application (the application name is "devicemgr.exe") and a parameter indicating opening of a device list screen in the device information management application ("NIL" in FIG. 5) corresponds to a piece of calling information. A set composed of a piece of information designating the device information management application (the application name is "devicemgr.exe") and a parameter indicating opening of a detail screen of a device designated in the device information management application (-s[printer], -s[scanner], or -s[fax]) corresponds to a piece of calling information. In another example, a set composed of a piece of information designating a file list application (the application name is "filebrowser.exe") and a parameter (-p[folder]) indicating designation of a software button (operator image) "Open" in the file list application corresponds to a piece of calling information.

In addition, the memory 12 stores pieces of job management information in the data structure as illustrated in FIG. 6. Each piece of job management information is provided for managing jobs and includes an identifier ID for identifying a job, the start date and time of the job, the status of the job, the content of the job, a comment to be displayed on the job list screen, and the corresponding piece of calling information. FIG. 7 illustrates example pieces of job management information.

Figure 8:
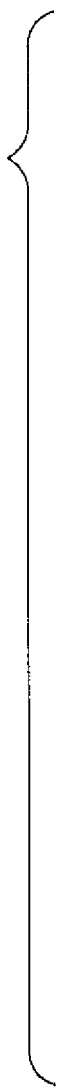
FIG. 8 is a table illustrating example association between an assumed condition of a process in each application and corresponding calling information.

The memory 12 also stores assumed statuses ("Condition" in FIG. 8) of processes in the applications as illustrated in FIG. 8 and the aforementioned pieces of calling information in association with each other. For example, when a process succeeds in a drawing difference detection application that detects a difference between two images and displays the difference in a distinguished manner, all the files in a file list displayed by the file list application and the software button "Open" (operator image) are displayed in a selected state. In addition, when translation accuracy is low in the scan and translation application that scans and translates a document, the file list application displays all the files in the file list in the selected state, and further the device information management application displays scan information.

Operations

Figure 9:
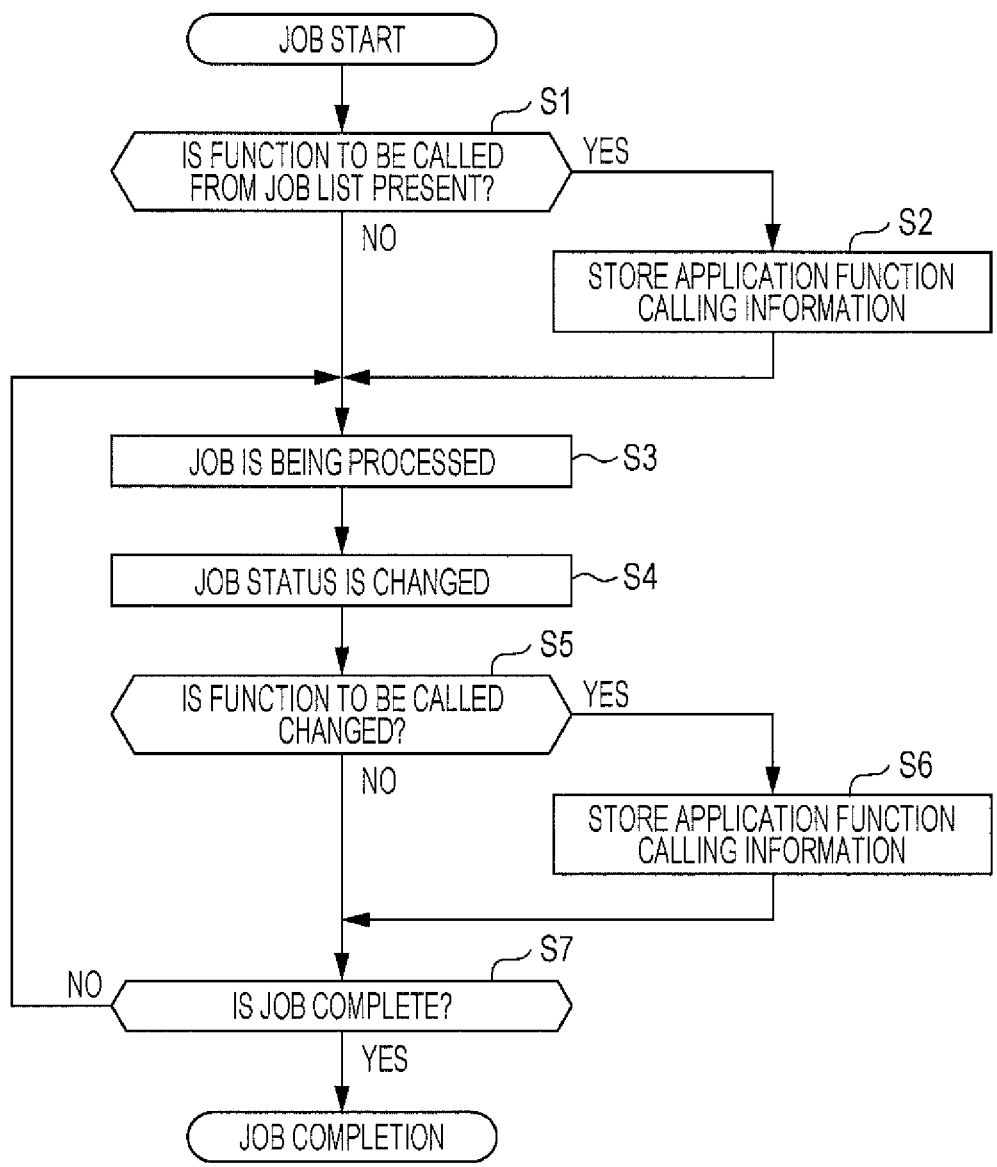
FIG. 9 is a flowchart illustrating processing performed by the controller.

Operations according to the exemplary embodiment will be described. In FIG. 9, when an application that processes a job (such as the drawing difference detection application or the scan and translation application) starts the job, the controller 11 judges whether a function of the application to be called from the job list is present on the basis of information as illustrated in FIG. 8 (step S1). Specifically, the controller 11 identifies the job status (Condition in FIG. 8) in the application in the job list and judges whether a piece of calling information (FIG. 8) has been stored in the memory 12 in association with the status of the identified job. If the piece of calling information is present (YES in step S1), the controller 11 reads the piece of calling information (FIG. 5) from the memory 12 and stores the piece of calling information in the RAM (step S2).

While the job is being processed (step S3), and every time the status of the job is changed (step 84), the controller 11 judges whether the function of the application to be called from the job list is changed, on the basis of the information as illustrated in FIG. 8 (step S5). If the function to be called from the job list is changed (YES in step S5), the controller 11 reads, from the memory 12, a piece of calling information for the function to be called and overwrites the piece of calling information previously stored in the RAM with the read piece of calling information (step 86). The controller 11 repeats steps S3 to S6 as described above until jobs of applications in the job list are complete (YES in step S7). A piece of calling information for the current process in each application is thereby stored in the RAM at all times.

Figure 10:
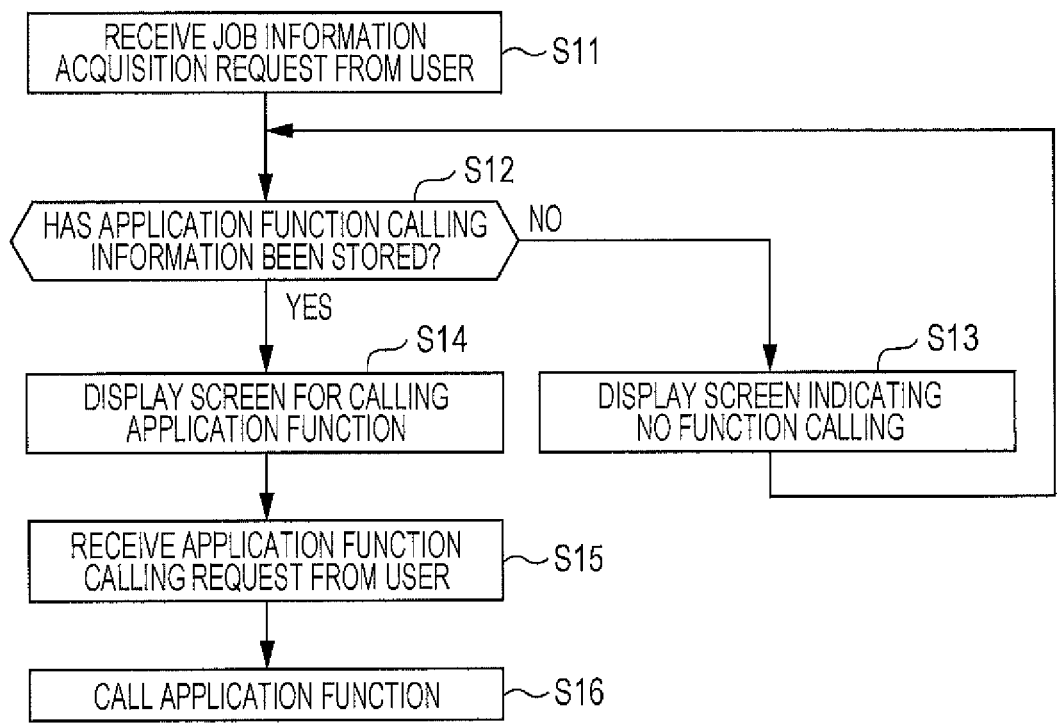
FIG. 10 is a flowchart illustrating processing performed by the controller.
Figure 11:
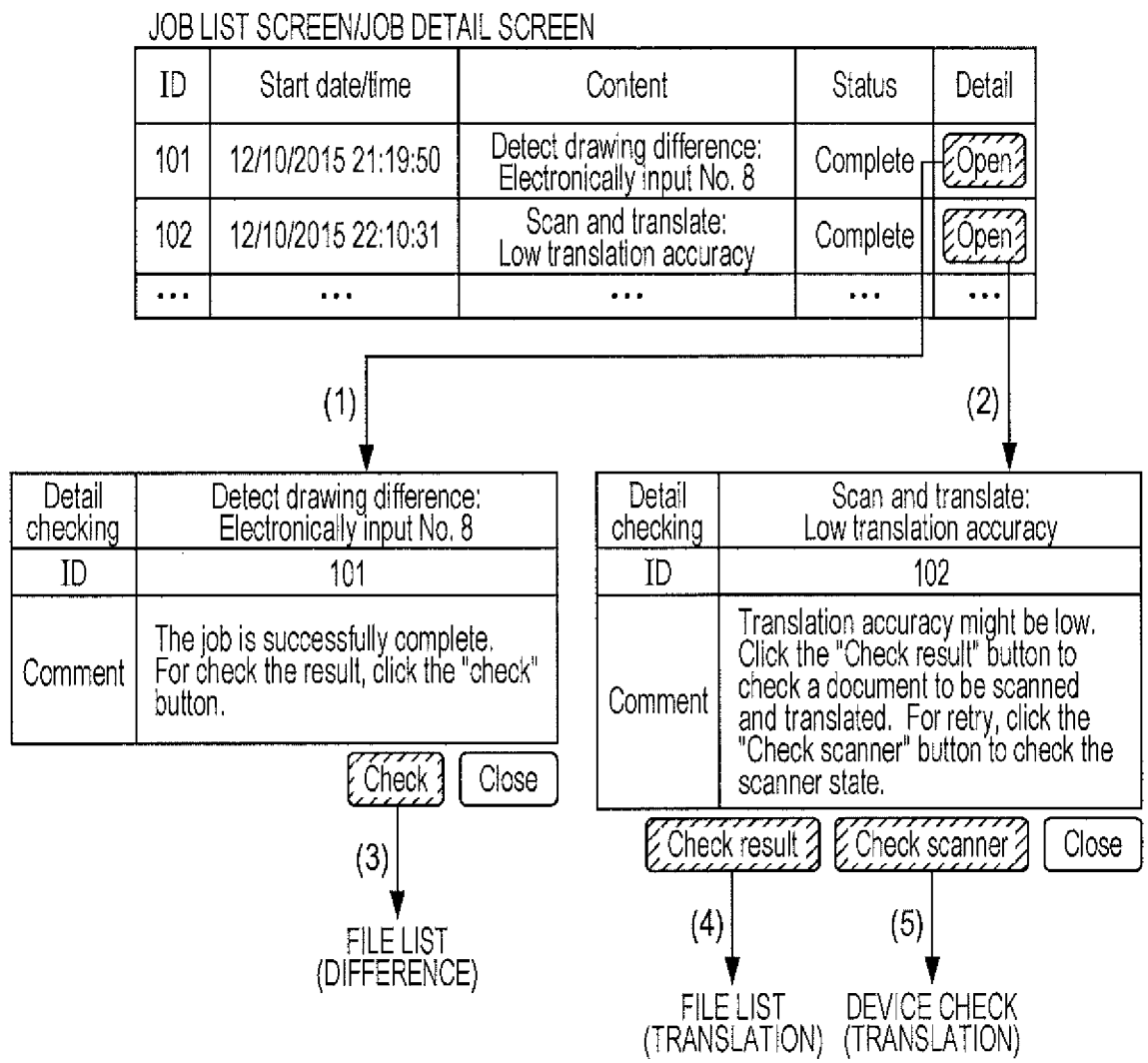
FIG. 11 is a diagram illustrating the screen transition according to the exemplary embodiment.

A process for displaying the job list by using the piece of calling information stored in the RAM in the processing in FIG. 9 will be described with reference to FIG. 10. In FIG. 10, if the user requests acquisition of job information by using a job list application, that is, if the user requests display of the job list (step S11), the controller 11 judges whether a piece of calling information for the job has been stored in the RAM (step S12). If the piece of calling information has been stored in the RAM (YES in step S12), the controller 11 uses the piece of calling information to display the job list screen that enables the function of the application to be called (step S14). Specifically, as illustrated in FIG. 11, the controller 11 arranges and displays the software button (operator image) "Open" for performing operation of a function of each application in the detail column of the job list screen for the applications. If the piece of calling information has not been stored in the RAM (NO in step S12), the controller 11 displays a screen indicating no function calling.

In FIG. 10, when the controller 11 receives a calling request from the user, that is, when an operator image "Open" is operated in the example in FIG. 11 (step S15), the controller 11 calls a requested function of an application and displays an operation screen for performing operation of the function (step S16). For example, if an operator image "Open" is operated for the drawing difference detection application in FIG. 11, the screen transitions to an operation screen for the drawing difference detection application (arrow (1)). For example, if an operator image "Open" is operated for the scan and translation application, the screen transitions to an operation screen for the scan and translation application (arrow (2)). The operation screens are arranged in multiple levels. For example, if an operator image "Check" is operated on the highest-level operation screen in the drawing difference detection application, the screen transitions to the file list screen illustrated in FIG. 12B that corresponds to a one-level lower operation screen (arrow (3)). For example, if an operator image "Check result" is operated on the highest-level operation screen in the scan and translation application, the screen transitions to the file list screen illustrated in FIG. 12C that corresponds to a one-level lower operation screen (arrow (4)). If an operator image "Check scanner" is operated on the highest-level operation screen in the scan and translation application, the screen transitions to the device check screen illustrated in FIG. 13B that corresponds to a one-level lower operation screen (arrow (5)). As described above, an operation screen to be called next from the current operation screen has been determined in accordance with the stored information as illustrated in FIG. 8. The user operates an application-specific function on the corresponding operation screen.

Modifications

Modifications may be made to the exemplary embodiment as follows. Multiple modifications may be combined.

Modification 1

In the exemplary embodiment, pieces of calling information each for calling an application function are stored. If an operator is operated in the process list, an operation screen for performing operation of the application function is displayed on the basis of a piece of calling information assigned to the operator. More specifically, in the exemplary embodiment, the image forming apparatus 10 stores the statuses of jobs (Conditions) and pieces of calling information in association with each other (FIG. 8), identifies the status of a job being executed, reads a piece of calling information associated with the identified status of the job, and displays an operation screen for performing operation of the application function on the basis of the piece of calling information (FIG. 5). That is, every time the status of the job is changed, the image forming apparatus 10 reads an associated piece of calling information and displays the corresponding operation screen. Alternatively, the image forming apparatus 10 may read all the pieces of calling information from the memory 12 at the time of job start and store the pieces of calling information in the RAM. When the status of the job is changed, the image forming apparatus 10 may select a piece of calling information corresponding to the change result and display an operation screen by using the selected piece of calling information. That is, the controller 11 reads all the pieces of calling information, identifies the status of a process being executed, and displays an operation screen for performing operation of an application function on the basis of one of the read piece of calling information that is associated with the identified status of the process.

Modification 2

In the exemplary embodiment, each piece of calling information is described using a command line option but may be described using, for example, a uniform resource locator (URL) query string (for example, #?function=filebrowse,openfolder=c:\user\fujii, selection=fileA#fileB,selectbutton=open) or an application program interface (API) (for example, call(filebrowse, c\user\fujii,filelist,open). That is, any calling format may be used.

Modification 3

The degree of detail of designation of an application function depends on the application. For example, a function of filtering based on an extension, a user, an application that generates the screen, or the like may be provided on a file list screen, or a function of enabling or disabling a designated button may be provided.

Modification 4

Any status of a process may be used to call a function. For example, if e-mailing of scanned data fails in the drawing difference detection application, an operator image (software button) for performing operation of a function such as calling a function of checking a mail server or calling an e-mail address screen of an address book may be additionally displayed.

Modification 5

In the exemplary embodiment, job management information has six job attributes but may have other attributes such as an end time, the progress, a counterpart, and an application name in addition to these. The job attributes other than the calling information may be eliminated depending on the configuration of the system.

Modification 6

In the exemplary embodiment, the job detail screen is provided separately from the job list screen, but the operator images (in any form enabling a function to be called, such as a link) may be arranged on the job list screen to display a comment in a popover (a balloon is displayed when the cursor is placed on an operator image).

Modification 7

In the exemplary embodiment described above, the image forming apparatus 10 displays the job list screen and the operation screens serving as the user interface, but an information processing apparatus such as a personal computer serving as a host apparatus of the image forming apparatus 10 may display these screens.

Modification 8

In the exemplary embodiment described above, the example in which the controller 11 runs the programs to thereby implement the functions described above has been described, but the functions may be implemented by hardware circuits. The programs may also be provided in such a manner as to be recorded in a computer readable recording medium such as an optical recording medium or a semiconductor memory. The programs may be read from the recording medium to be installed on the information processing apparatus. The programs may also be provided through an electric telecommunications network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display that simultaneously displays:
   (i) a list of processes that have been previously executed or are being currently executed by applications;
   (ii) a status of each one of the processes; and
   (iii) an operator for each one of the processes; and
   a processor programmed to:
   in response to an operator of a respective process being operated by a user, replace the display of (i), (ii) and (iii) with display of an operation screen that includes detailed information about a status of the respective process, and that includes another operator for performing a function that is related to the detailed information and for performing an operation related to a hardware device used in the respective process, wherein
   when the respective process is a scan and translation application, and when the detailed information about the status indicates a low translation accuracy, the another operator includes a first operator for listing files and a second operator for checking a scanner.

2. The information processing apparatus according to claim 1, wherein the processor is programmed to:
   store pieces of calling information for each operator; and
   when the operator of the respective process is operated, replace the display of (i), (ii) and (iii) with the display of the operation screen based on one of the pieces of calling information that is assigned to the operator of the respective process.

3. The information processing apparatus according to claim 2, wherein the processor is programmed to:
   store statuses of the processes and the pieces of calling information in association with each other; and
   identify the status of the respective process in the stored statuses, read one of the pieces of calling information that is associated with the identified status, and cause the operation screen to be displayed based on the read one of the pieces of calling information.

4. The information processing apparatus according to claim 2, wherein the processor is programmed to:
   store statuses of the processes and the pieces of calling information in association with each other; and
   read all of the pieces of calling information, identify the status of the respective process in the stored statuses, and cause the operation screen to be displayed based on one of the read pieces of calling information that is associated with the identified status.

5. A non-transitory computer readable medium storing a program causing a computer to execute a process, the process comprising:
   simultaneously displaying:
   (i) a list of processes that have been previously executed or are being currently executed by applications;
   (ii) a status of each one of the processes; and
   (iii) an operator for each one of the processes; and
   in response to an operator of a respective process being operated by a user, replacing the display of (i), (ii) and (iii) with display of an operation screen that includes detailed information about a status of the respective process, and that includes another operator for performing a function that is related to the detailed information and for performing an operation related to a hardware device used in the respective process, wherein
   when the respective process is a scan and translation application, and when the detailed information about the status indicates a low translation accuracy, the another operator includes a first operator for listing files and a second operator for checking a scanner.

6. An information processing apparatus comprising:
   a display that simultaneously displays:
   (i) a list of processes that have been previously executed or are being currently executed by applications;
   (ii) a status of each one of the processes; and
   (iii) an operator for each one of the processes; and
   a processor programmed to:
   in response to an operator of a respective process being operated by a user, replace the display of (i), (ii) and (iii) with display of an operation screen that includes detailed information about a status of the respective process, and that includes another operator for performing a function that is related to the detailed information and for performing an operation related to a hardware device used in the respective process, wherein
   when the respective process is a drawing difference detection application, and when the detailed information about the status indicates a difference detected between two or more images, the another operator includes a first operator for listing files and a second operator for checking a printer.

7. The information processing apparatus according to claim 6, wherein the processor is programmed to:
   store pieces of calling information for each operator; and
   when the operator of the respective process is operated, replace the display of (i), (ii) and (iii) with the display of the operation screen based on one of the pieces of calling information that is assigned to the operator of the respective process.

8. The information processing apparatus according to claim 7, wherein the processor is programmed to:
   store statuses of the processes and the pieces of calling information in association with each other; and
   identify the status of the respective process in the stored statuses, read one of the pieces of calling information that is associated with the identified status, and cause the operation screen to be displayed based on the read one of the pieces of calling information.

9. The information processing apparatus according to claim 7, wherein the processor is programmed to:
   store statuses of the processes and the pieces of calling information in association with each other; and
   read all of the pieces of calling information, identify the status of the respective process in the stored statuses, and cause the operation screen to be displayed based on one of the read pieces of calling information that is associated with the identified status.

* * * * *